United States Patent [19]
Thomas

[11] Patent Number: 5,242,583
[45] Date of Patent: Sep. 7, 1993

[54] WIRE SCREEN CLAMP
[75] Inventor: John Thomas, Brookfield, Wis.
[73] Assignee: Envirex Inc., Waukesha, Wis.
[21] Appl. No.: 924,199
[22] Filed: Aug. 3, 1992
[51] Int. Cl.$^5$ ............................................. B01D 27/04
[52] U.S. Cl. .................................... 210/161; 210/232; 210/499; 55/DIG. 31; 29/163.8; 160/369
[58] Field of Search .............. 29/163.8; 210/155, 157, 210/158, 159, 161, 162, 232, 499; 166/227; 55/525, DIG. 31; 209/233; 403/24; 160/368.1, 369, 371

[56] References Cited
U.S. PATENT DOCUMENTS

| | | |
|---|---|---|
| 736,802 | 8/1903 | De Vries . |
| 1,698,064 | 1/1929 | Otto . |
| 1,776,284 | 9/1930 | Herbest et al. . |
| 1,786,040 | 12/1930 | Taylor . |
| 1,796,581 | 3/1931 | Siebenlist . |
| 1,814,322 | 7/1931 | McCormack . |
| 1,895,309 | 1/1933 | Boomershine . |
| 2,996,189 | 8/1961 | Salterbach ............................ 210/155 |
| 3,291,164 | 12/1966 | Swallow ................................ 140/109 |
| 3,704,563 | 12/1972 | Waller .................................... 52/455 |
| 3,850,804 | 11/1974 | Taylar et al. ......................... 210/155 |
| 4,443,126 | 4/1984 | Strow et al. ........................... 403/24 |
| 4,582,601 | 4/1986 | Strow et al. ......................... 210/499 |
| 4,820,407 | 4/1989 | Lilie ..................................... 210/499 |
| 5,020,678 | 6/1991 | Klein .................................... 211/191 |

FOREIGN PATENT DOCUMENTS
431386 7/1935 United Kingdom .

Primary Examiner—Robert A. Dawson
Assistant Examiner—W. L. Millard
Attorney, Agent, or Firm—Michael, Best & Friedrich

[57] ABSTRACT

A clamp or clamping member for securing a screen to a support, the clamp having a clamping face adapted to engage the screen and an opposite face, opposite sides and opposite ends. The junction between the clamping face and at least one of the opposite sides forms a curved surface between the clamping face and that side. This curved surface is adapted to engage a screen fixed to the support and the curved surface defines a radius in a plane transverse to the clamping face and the opposite sides. The clamp additionally includes an opening extending therethrough from the opposite surface to the clamping surface, the opening being elongated in the direction between the opposite sides and adapted to allow variable location of a bolt with respect to the clamp for securing the clamping member and the screen to the support.

15 Claims, 2 Drawing Sheets

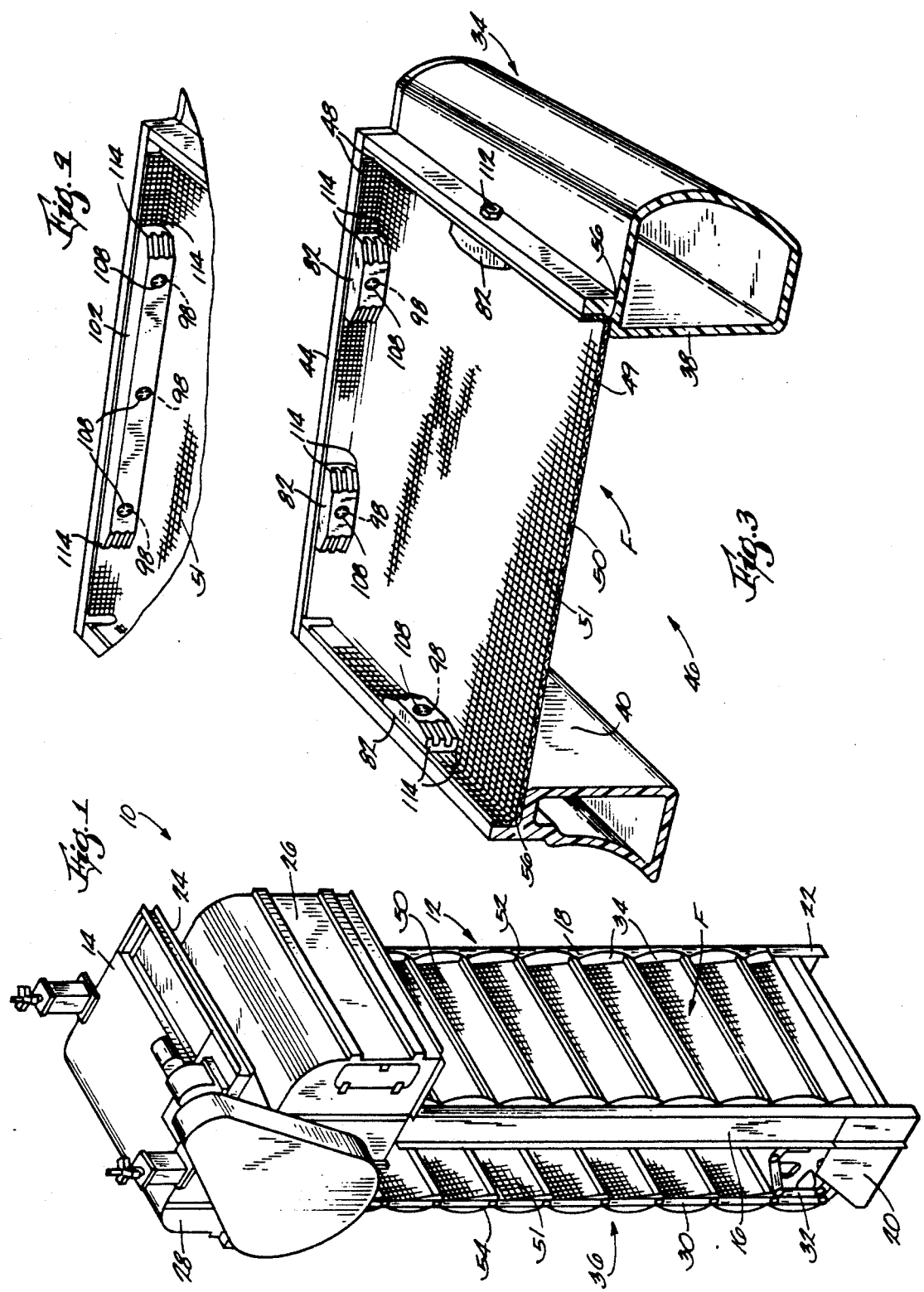

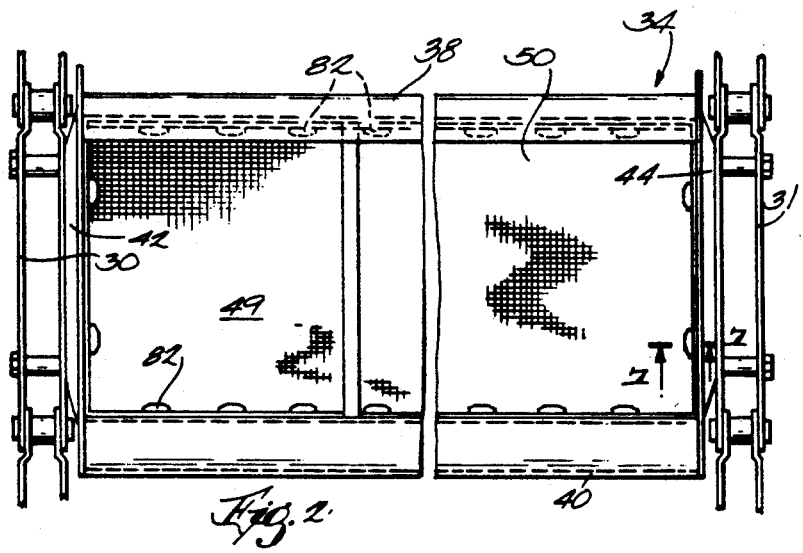
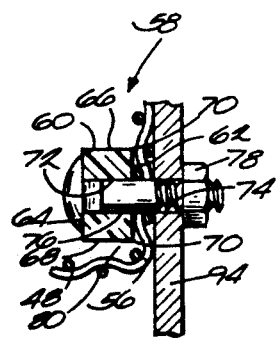
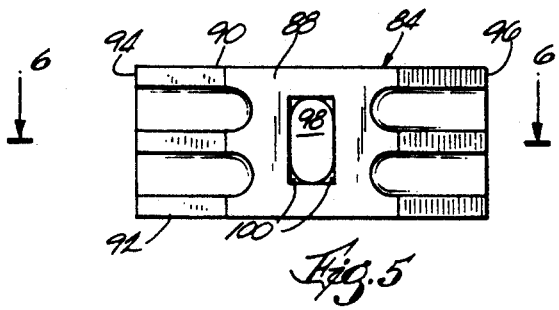
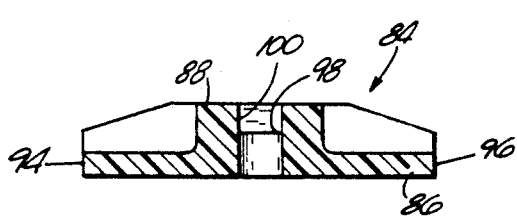
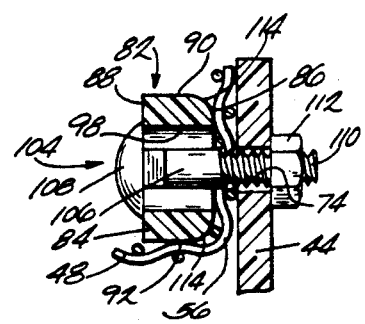
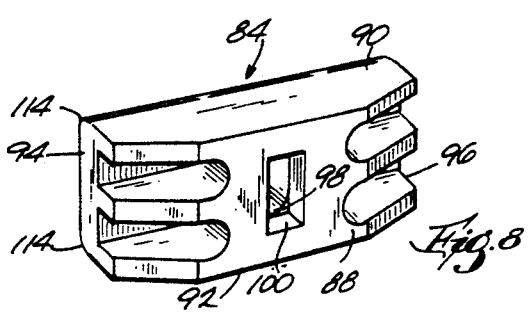

WIRE SCREEN CLAMP

BACKGROUND OF THE INVENTION

This invention relates to clamps and, more particularly, to a clamp for securing wire screen to a traveling water screen used with water treatment intakes and the like.

Traveling water screens are used for screening water at the water intakes of power plants and also in many other types of processing centers which consume large amounts of water, both in industry and in government, where it is necessary to screen or filter debris and fish from large volumetric flows of water. A typical application is a power plant which requires a continuous, large volume stream of cooling water. Normally, the water for this purpose is supplied via a watercourse extending between the plant and a water source such as a lake, river, or ocean. Debris enters the watercourse with the water and must be filtered or screened out to prevent disruption of the operation of the plant or damage to equipment.

A number of traveling water screens are typically positioned in a concrete structure spanning the watercourse. Each traveling water screen commonly includes a series of screening panels attached between a pair of chains which are in turn supported on a pair of head sprockets at the top, and a pair of foot sprockets at the bottom, so that the screening panels form an endless band. The head sprockets are driven so that the screening panels lift out of the water on the upstream side, taking debris with them. Debris is then typically removed by a water spray near the top of the structure. The screen units then descend on the downstream side and pass around the foot sprockets to ascend again on the upstream side.

The screening panels carried by the heavy parallel chains each include a basket having a rectangular frame which is carried at its opposite ends by the spaced apart scrolled chains. The rectangular frames of the baskets each include end plates and transverse members extending between the chains. A generally rectangular panel of woven wire screen is fixed to the rectangular frames. In some such arrangements, as illustrated in U.S. Pat. No. 4,443,126, assigned to the assignee of the present invention, the margins or peripheral edges of the woven wire screens are bent 90° to permit the screens to be fastened to the rectangular frames. In other prior art traveling water screen constructions, the basket frames may have four flat surfaces in a common plane and against which the margins of the flat screen panel are secured. In both prior art basket constructions described above, a rigid clamping bar typically overlies each screen margin, with bolts extending through holes in the bar and into aligned holes in the frame members, with the bolts tightened to clamp the screen margins between the clamping bars and frame member, and to secure the screen to the frame. All of the above mentioned parts are generally stainless steel or other corrosion resistant material, such as painted carbon steel.

U.S. Pat. No. 4,443,126 illustrates non-metallic clamping bars for securing screens to basket frames of a travelling water screen wherein the screens are bent 90°. The non-metallic clamping bars comprise strips of a rigid polyvinyl chloride compound or other durable engineered plastic, and the clamping bars are secured to inner surfaces of the basket frames by bolts extending through the clamping bars, screens and frame. The synthetic material forming the clamping bars is non-corrosive and of less cost than metal strips.

For such traveling water screens used in water intakes of power plants or other industrial or municipal applications or systems which take in large volumes of water, the wire screen experiences considerable force from and in the direction of the flow of water and the screen is placed under substantial tensile forces. Failure of the screen can occur from metal fatigue caused by repeated or cyclical flexing of the screen due to the force of water on the screen. Metal fatigue tends to occur at areas where the clamps attach the wire screen to the frames, particularly where a hole in the screen does not align with the holes in the clamping bar and frame, leaving some slack in the screen. This increases the chances of screen fatigue because the cyclic bending from water pressure repeatedly bends the screen at the region of slack between the screen and the clamp, which can result in failure of the screen at the clamp margin.

SUMMARY OF THE INVENTION

Among the objects of this invention is to provide a traveling water screen including an improved clamp for securing wire screen to the frame of the travelling water screen basket.

A more specific object is to provide such a wire screen clamp which will minimize screen failure Another object is to provide such a clamp which permits a better fit of screen to clamp at the clamp edges.

A further object is to provide a clamp which can be adjusted in application to allow alignment of the clamp hole with a screen opening.

For the achievement of these and other objects, the invention includes an improved clamp for holding wire screen to the basket frame of a traveling water screen. The invention can be used with traveling water screens and the like, but applies to other wire screen applications, such as gratings. Screens used for screening solids, liquids or gases could all benefit from the wire screen clamp embodying the invention.

The clamp includes a clamp member having a clamping face adapted to engage the screen and an opposite face, the clamping member having opposite sides and opposite ends. The junction between the clamping face and at least one of the opposite sides forms a smooth curved surface between the clamping face and that side, the curved surface forming rounded corners adapted to engage a screen fixed to the support. The radius of curvature of the rounded corners permits the screen to form a smooth curve and the screen can engage, or maintain contact with, the surface of the clamp throughout the corner. The rounded corners thus allow the screen to maintain contact with the clamp along the entire radius of the corner, providing greater support for the material of the screen, which in turn reduces fatigue failure at the clamp corner and screen interface.

The clamping member further includes an opening extending therethrough from the opposite surface to the clamping surface, the opening being elongated in the direction between the opposite sides and adapted to allow variable location or positioning of the clamping member with respect to a fastening structure to facilitate proper position and securing of the clamping member and the screen to the support. The clamp also includes a fastening structure extending through the opening for securing the clamping member and the screen to the support.

The provision of the elongated opening allows flexibility in location of the fastening structure, so that the latter can be aligned with an existing screen hole. This permits adjustment in the screen position to allow formation of a snug connection between the lower clamp corners and the bent portion of the screen. The clamp thus helps to prevent premature screen failure.

Other features and advantages of the invention will become apparent to those of ordinary skill in the art upon review of the following detailed description, claims, and drawings.

BRIEF DESCRIPTION OF THE DRAWINGS

FIG. 1 depicts a typical traveling water screen used for screening water at the water intakes of power plants and the like.

FIG. 2 shows a front view, or screening surface, of a screening panel of the traveling water screen shown in FIG. 1.

FIG. 3 is an enlarged perspective view of the back of the screening panel shown in FIG. 2 with portions cut away for purposes of illustration.

FIG. 4 is a cross section view of a clamping strip of the type used in prior art traveling water screen baskets and secured by a single bolt to a basket frame.

FIG. 5 is an enlarged plan view of a clamping member used in the screening panel shown in FIG. 2.

FIG. 6 is a cross section of the clamp member of FIG. 5 taken along lines 6—6 of FIG. 5.

FIG. 7 is a cross section view of the clamp of the invention secured by a single bolt to attach a wire screen to a basket frame and taken along lines 7—7 of FIG. 2.

FIG. 8 is a perspective view of the clamping member shown in FIG. 5.

FIG. 9 is a depiction of an alternative screen clamp of the invention, having strips rather than discreet clamp members for attaching the screening to portions of the basket frame members.

DESCRIPTION OF THE PREFERRED EMBODIMENT

FIG. 1 illustrates a water screening or filtering installation 10 which includes a traveling water screen unit 12. The installation 10 spans a watercourse defining an inlet water channel or sluice which has water flowing therethrough in the direction shown by arrow F.

The traveling screen unit 12 is positioned in a concrete sluiceway (not shown), and includes a frame 14 having a pair of vertically disposed support posts 16 and 18 supported on the sluiceway floor and extending upwardly through the sluiceway. The support posts 16 and 18 are fit into guide slots (not depicted) in the sides of the sluiceway. The frame 14 also includes a pair of lower support brackets 20 and 22 which extend downstream from the lower end of the support posts 16 and 18. The frame 14 also includes an upper drive housing 24 supported on the support posts 16 and 18. The drive housing 24 includes a front splash housing 26 and a rear splash housing 28. The drive housing houses the drive means (not illustrated) for the travelling screen unit.

The traveling screen unit 12 also includes a pair of parallel spaced apart endless support chains 30 and 31 (only one shown in FIG. 1) each trained over one of two head sprockets (not shown) in the drive housing 24, and over one of two traction wheels 32 (one shown) disposed near the bottom of the sluiceway. The pair of chains 30 and 31 are positioned in spaced apart relation on opposite sides of the sluice. As best visualized with reference to FIGS. 1 and 2, a plurality of baskets 34 are interconnected by the chains 30 and 31 to form an endless screen 36. As best seen in FIGS. 2 and 3, each of the baskets 34 includes a basket frame defined by an upper frame member 38, a lower frame member 40, and opposite end members 42 and 44 interconnecting the ends of the upper and lower frame members 38 and 40 to form a generally rectangular frame structure, the basket frame thereby forming a generally rectangular opening 46. The frame members 38, 40, 42 and 44 are preferably formed of glass reinforced plastic or stainless steel but are more commonly of carbon steel galvanized or painted. A screen 48, generally of a woven wire construction, is held between the frame members 38, 40, 42 and 44, and completely covers the frame opening 46, the screen 48 forming a screening panel 49. The screening panel 49 has a front surface, or screening surface 50 and a back surface 51 (FIG. 3). While other types of wire screen could be used, in a preferred form of the invention a wire mesh screen is used, the wire mesh screen woven from stainless steel wire of twelve gauge strength and woven to have a three-eights inch (9.52 mm) mesh. In other embodiments the screen 48 can be formed from various size wires and may have a different size mesh, or can be comprised of molded, perforated or mesh plastic sheets. In some instances the wire of the screen 48 will be bent with a drift to provide alternately larger openings for bolts.

The basket frames 34 are arranged in series (FIG. 1) and connected between the support chains 30 and 31 by securing the ends of the basket frames to corresponding links of the support chains 30 and 31. The endless screen member 36 includes an upward run 52 wherein basket frames 34 ascend, and a downward run 54 wherein basket frames 34 descend (FIG. 1). As basket frames 34 travel upwardly in the upward run 52, they are exposed to water forces flowing against the screening surface 50 of the screening panel 49, and in the direction of the arrows in FIGS. 1 and 3. The water flowing through the sluiceway is continually filtered of fish and debris, and debris is deposited on the screening surface 50. In the upward run 52, the support chains 30 and 31 are guided in guide channels (not depicted) provided in the support posts 16 and 18. These guide channels function as a labyrinth seal for exclusion of fish and debris, and also support the chains 30 and 31 against the hydraulic force of the water flowing through the sluiceway. During the downward run 54, the water flows against the back side 51 of the screens 48.

Where the screen 48 is attached to the frame members 38, 40, 42 and 44 (FIG. 3) the edges of the screen 48 are positioned or oriented perpendicular to the plane of the screening panel 49 which covers the opening 46 defined by the basket frame. Therefore, there is a 90° bend 56 in the screen where it is attached to each frame member.

FIG. 4 is an illustration of a prior art clamp 58 which is used to secure wire screen to the frame of a travelling water screen. Each clamp 58 generally includes a clamp member 60 having a clamping face 62 adapted to engage the screen 48 and an opposite face 64. The clamping member has opposite sides 66 and 68 and opposite ends (not shown). The junction between the clamping face 62 and at least one of the opposite sides 66 and 68 forms an edge 70 between the clamping face 62 and that side 66 and 68. This prior art clamping member 58 additionally includes an opening 72 extending therethrough from face 64 to clamping face 66. An opening 74 is provided in the basket frame 34 and a bolt 76 extends through the opening 74 and is secured by a nut 78. The clamping member 58 and the screen 48 are thereby secured to the basket frame 34.

As seen in FIG. 4, between the bend 56 in the screen 48 and the clamping member 60 is a space, or gap 80. This gap is particularly pronounced when the openings 74 at opposite portions of the frame 34 do not line up with holes in the wire screen 48, leaving slack in the screen between clamping members 60. Additionally, slack in the screen 48 can develop over time from the alternating water force against the screening panel 49, as the endless screen member 36 alternates between upward runs 52 and downward runs 54.

As best illustrated in FIG. 2 (showing the back of a basket) and FIGS. 5 through 8, the invention provides an improved clamp 82 for securing a screen 48 to a support or basket frame. The clamp 82 generally comprises (FIGS. 5 through 8) a clamp member 84 having a clamping face 86, adapted to engage the screen 48 and secure it against the basket frame member, and an opposite face 88. The clamping member also has opposite sides 90 and 92 and opposite ends 94 and 96. The clamp member 84 is preferably rectangular, as in the illustrated embodiment, and is preferably formed of a thermoplastic material.

Each clamping member 84 has an opening 98 extending therethrough from the opposite surface 88 to the interclamping surface 86, the opening 98 being elongated in the direction between the opposite sides. A cross section of a clamping member is shown in FIG. 6. The elongated opening 98 may be provided with squared edges 100 at the ends near the opposite surface 88. An opening dimension of about ⅜ inch by ¾ inch (9.6 mm by 19.1 mm) would be typical for many traveling water screen applications. In the illustrated embodiment a plurality of clamps 82 are used to secure the screen 48 to the frame members 38, 40, 42 and 44 of basket frame 34 (FIGS. 2 and 3), but in alternative embodiments of the invention, the clamp member 82 could be a formed as a continuous strip 102 having multiple elongated openings with preselected spacing (FIG. 9). The length of such a strip 102 is longer, and the number of elongated placement holes is increased, but in other respects the strip embodiment is identical to that disclosed in FIGS. 5 through 8 for the clamp embodiment. Such a clamping strip 102 can be cut to length as required from extruded stock.

Fastening means 104 (FIG. 7) extends through the opening and secures the clamping member 84 and the screen 48 to the support frame 34, through the openings 74 provided in the basket support frame 34. The frame openings 74 are formed in respective frame members 38, 40, 42 and 44 of the basket frame 34 in a manner to match the spacing of the wires of the wire screen 48. If a continuous strip 102 is used rather than discreet clamp elements 82, the placement of the elongated openings 98 of the strip 102 would also be preselected to match the spacing of both the wires of the wire screen 48 and the frame openings 74.

In the illustrated embodiment the fastening means 104 comprises a bolt 106. The bolt 106 is preferably a carriage bolt with a smooth rounded head 108 and an adjacent shank portion 110. Depending upon the requirements and corrosive conditions of service, the bolt 106 is preferably manufactured of stainless steel, but may be also be of carbon steel protected by cadmium or zinc plating or other suitable material. The bolt 106 is typically passed through the opening 98 from the opposite face 88, through an opening in the wire screen 48 and opening 74 in the frame 34 and is secured to the frame 34 by use of a nut 112.

The elongated opening 98 in the clamping member 84 is functions to allow variable location of the fastening means 104, or bolt 106, with respect to the clamping member 84 in securing the clamping member 84 and the screen 48 to the support frame 34. The bolt 106 is thereby easily aligned within the elongated opening 98 to pass through the wire screen 48 between intersecting wires. As mentioned previously, the elongated opening 98 of the clamp member 84 can be provided with squared edges 100 at the ends, whereby a step bolt can be used to prevent bolt rotation while tightening the nut 112. Alternately, a top portion or portions of the hole 98 may be provided with a recess (not shown) to fit the head of a hexagonal nut or bolt head to prevent rotation when using such a bolt.

The junction between the clamping face 86 and at least one of the opposite sides 90 and 92 forms a curved surface 114 between the clamping face 86 and the at least one of the sides 90 and 92 (FIGS. 7 and 8). The curved surface 114 defines a radius in a plane transverse to the clamping face 86 and the opposite sides 90 and 92. The curved surface 114 is adapted to engage the screen 48 that is fixed to the support frame 34. Curved surface 114 is preferably provided at both corners for interchangeability and ease of assembly of the clamp. As best seen in FIG. 7, with the curved surface 114 at the bottom corners, the clamp member 84 can be closely set along the entire radius of the curved surface 114 against the bend 56 of the wire screen 48. Since the clamp member 84 has an elongated hole 98, the placement of the clamp member 84 can be made so that the wire screen 48 is snug along the entire radius of the curved surface 114 and this provides uniform support to the bend 56 formed in the wire screen 48. Sag in the wire screen 48 under water pressure is thereby greatly reduced, preventing fatigue failure of the wire screen 48 from cyclic creasing and bending, which occurs in the prior art wire screen clamps (FIG. 4) when the alternating water pressure works the gap 80 formed between the clamp member 60 and the screen 48.

Although one embodiment of the present invention has been illustrated and described, it will be apparent to those skilled in the art that various changes and modifications may be made therein without departing from the spirit of the invention or from the scope of the appended claims.

I claim:

1. A clamp for securing a screen to a support, said clamp comprising a clamp member having a clamping face adapted to engage the screen and an opposite face, and the clamp member having opposite sides and opposite ends, the junction between the clamping face and at least one of the opposite sides forming a curved surface between the clamping face and the at least one of the sides, the curved surface being adapted to engage a screen fixed to the support and the curved surface defining a radius in a plane transverse to the clamping face and the opposite sides, and said clamp member having an opening extending therethrough from said opposite surface to said clamping surface, said opening being elongated in the direction between said opposite sides, said opening being adapted to allow variable location of a fastening means with respect to said clamp member for securing said clamp member and the screen to said support; and fastening means extending through said opening and for securing said clamp member and the screen to said support.

2. The clamp of claim 1 wherein said clamp member is rectangular.

3. The clamp of claim 1 wherein said fastening means is a bolt.

4. The clamp of claim 3 wherein said screen is formed from intersecting wires.

5. The clamp of claim 4 wherein said bolt is aligned within said elongated opening to pass through said screen between said intersecting wires.

6. A basket for a traveling water screen, the basket comprising a basket frame including a plurality of frame members forming an opening, the opening adapted to facilitate the flow of water therethrough, a piece of woven wire screening covering the opening of the basket frame, the piece of woven wire screening having a periphery secured to and supported by the frame members, and a plurality of spaced apart clamps for securing the periphery of the woven wire screening to the frame members, a plurality of clamps secured to each of the frame members, at least one of the clamps having a clamping face adapted to engage the screen and an opposite face, opposite sides and opposite ends, the junction between the clamping face and at least one of the opposite sides forming a curved surface between the clamping face and the at least one of the sides, the curved surface being adapted to engage a screen fixed to the support and the curved surface defining a radius in a plane transverse to the clamping face and the opposite sides, and said at least one of the clamps having an opening extending therethrough from said opposite surface to said clamping surface, said opening being elongated in the direction between said opposite sides, said opening being adapted to allow variable location of a fastening means with respect to said clamping member for securing said at least one of the clamps and the screen to said support; and fastening means extending through said opening and for securing said at least one of the clamps and the screen to said support.

7. The clamp of claim 6 wherein said clamp member is rectangular.

8. The clamp of claim 6 wherein said fastening means is a bolt.

9. The clamp of claim 8 wherein said screen is formed from intersecting wires.

10. The clamp of claim 9 wherein said bolt is aligned within said elongated opening to pass through said screen between said intersecting wires.

11. A traveling water screen comprising a frame adapted to be positioned in a waterway, a pair of chains supported by the frame in spaced apart relation, a basket frame supported between the chains, the basket frame including a plurality of frame members forming an opening adapted to facilitate the flow of water therethrough, a piece of woven wire screening covering the opening of the basket frame, the piece of woven wire screening having a periphery secured to and supported by the frame members, a plurality of spaced apart clamp members for securing the periphery of the woven wire screening to the frame members, at least one of the spaced apart clamp members including a clamping face adapted to engage the screen and an opposite face, opposite sides and opposite ends, the junction between the clamping face and at least one of the opposite sides forming a curved surface between the clamping face and the at least one of the sides, the curved surface being adapted to engage a screen fixed to the support, and the curved surface defining a radius in a plane transverse to the clamping face and the opposite sides, and said at least one of the clamp members each having an opening extending therethrough from said opposite surface to said clamping surface, said opening being elongated in the direction between said opposite sides, said opening being adapted to allow variable location of fastening means with respect to said at least one of the clamp members for securing said at least one of said clamp members and the screen to said support; and fastening means extending through said opening and for securing said at least one of said clamp members and the screen to said support.

12. The clamp of claim 1 wherein said clamp member is rectangular.

13. The clamp of claim 1 wherein said fastening means is a bolt.

14. The clamp of claim 3 wherein said screen is formed of intersecting wires.

15. The clamp of claim 4 wherein said bolt is aligned within said elongated opening to pass through said screen between said intersecting wires.

* * * * *

UNITED STATES PATENT AND TRADEMARK OFFICE
CERTIFICATE OF CORRECTION

PATENT NO. : 5,242,583
DATED : September 7, 1993
INVENTOR(S) : John Thomas

It is certified that error appears in the above-identified patent and that said Letters Patent is hereby corrected as shown below:

In Column 8, line 44, after "Claim", delete "1" and insert --11--.

In Column 8, line 46, after "Claim", delete "1" and insert --11--.

In Column 8, line 48, after "Claim", delete "3" and insert --13--.

In Column 8, line 50, after "Claim", delete "4" and insert --14--.

Signed and Sealed this

Twelfth Day of April, 1994

Attest:

BRUCE LEHMAN

*Attesting Officer*     *Commissioner of Patents and Trademarks*